(12) United States Patent
Bergman et al.

(10) Patent No.: US 9,344,451 B2
(45) Date of Patent: May 17, 2016

(54) ENHANCED THREAD HANDLING IN SECURITY HANDSHAKING

(71) Applicant: Fastly, Inc., San Francisco, CA (US)

(72) Inventors: Artur Bergman, San Francisco, CA (US); Alan Kasindorf, Mountain View, CA (US); Rogier Mulhuijzen, Den Haag (NL)

(73) Assignee: Fastly, Inc., San Francisco, CA (US)

( * ) Notice: Subject to any disclaimer, the term of this patent is extended or adjusted under 35 U.S.C. 154(b) by 0 days.

(21) Appl. No.: 14/347,050

(22) PCT Filed: Feb. 20, 2014

(86) PCT No.: PCT/US2014/017286
§ 371 (c)(1),
(2) Date: Mar. 25, 2014

(87) PCT Pub. No.: WO2014/130620
PCT Pub. Date: Aug. 28, 2014

(65) Prior Publication Data
US 2015/0341386 A1    Nov. 26, 2015

Related U.S. Application Data

(60) Provisional application No. 61/766,807, filed on Feb. 20, 2013.

(51) Int. Cl.
*G06F 7/04* (2006.01)
*H04L 29/06* (2006.01)

(52) U.S. Cl.
CPC ............ *H04L 63/168* (2013.01); *H04L 63/166* (2013.01); *H04L 63/205* (2013.01)

(58) Field of Classification Search
CPC ................................ H04L 63/08; H04L 63/10
USPC ............................................................. 726/3
See application file for complete search history.

(56) References Cited

U.S. PATENT DOCUMENTS

| 6,385,644 | B1 | 5/2002 | Devine et al. |
|---|---|---|---|
| 2001/0018701 | A1 | 8/2001 | LiVecchi |
| 2006/0272023 | A1 | 11/2006 | Schmeidler et al. |
| 2008/0046717 | A1 | 2/2008 | Kanekar et al. |
| 2010/0106852 | A1* | 4/2010 | Kindig ............. G06F 17/30035 709/231 |
| 2012/0265991 | A1 | 10/2012 | Kanekar et al. |
| 2014/0165147 | A1* | 6/2014 | Hershberg ............ H04L 63/083 726/4 |

OTHER PUBLICATIONS

Priyadarshini, Pallavi. "A Peer-to-Peer Rights Management System". Nov. 2006.

* cited by examiner

*Primary Examiner* — Anthony Brown

(57) ABSTRACT

Disclosed herein are methods, systems, and software for handling threaded processes in security handshaking between end users and content delivery nodes are presented. In one example, a method of operating a content delivery node includes identifying a secure layer connection request within an application thread, and initiating a new thread for a security handshake process based on the secure layer connection request. The method further includes, in response to completing the security handshake process, returning to the application thread.

20 Claims, 5 Drawing Sheets

ENHANCED THREAD HANDLING IN SECURITY HANDSHAKING

RELATED APPLICATIONS

This application hereby claims the benefit of and priority to U.S. Provisional Patent Application 61/766,807, titled "ENHANCED THREAD HANDLING IN SECURITY HANDSHAKING", filed Feb. 20, 2013, and which is hereby incorporated by reference in its entirety.

TECHNICAL BACKGROUND

Network-provided content, such as Internet web pages or media content such as video, pictures, music, and the like, are typically served to end users via networked computer systems. End user requests for the network content are processed and the content is responsively provided over various network links. These networked computer systems can include hosting servers which host network content of content creators or originators, such as web servers for hosting a news website.

To ensure secure transfer of content between end users and hosting systems, such as web servers, various secure transport protocols have been developed. In some examples, such as secure sockets layer (SSL) or transport layer security (TLS), a handshaking process occurs to exchange various parameters for the secure layer activities as well as to negotiate encryption keys and other security information. However, when many end user devices request secured content or initiate secured connections during a similar time period, overloading on the hosting systems can occur.

OVERVIEW

Methods, systems, and software for handling threaded processes in security handshaking between end users and content delivery nodes are presented. In one example, a method of operating a content delivery node includes identifying a secure layer connection request within an application thread, and initiating a new thread for a security handshake process based on the secure layer connection request. The method further includes, in response to completing the security handshake process, returning to the application thread.

In another instance, a computer apparatus to operate a content delivery node includes processing instructions that direct the content delivery node to identify a secure layer connection request within an application thread. The processing instructions further direct the content delivery node to initiate a new thread for a security handshake process based on the secure layer connection request and, in response to completing the security handshake process, return to the application thread. The computer apparatus also includes one or more non-transitory computer readable media that store the processing instructions.

In a further example, a method of operating a content delivery node comprises receiving content requests from a plurality of end user devices and initiating an application thread based on the content requests. The method further includes identifying a plurality of secure layer connection requests within the application thread, and initiating a security handshaking thread for each of the secure layer connection requests.

DESCRIPTION

Network content, such as web page content, typically includes content such as text, hypertext markup language (HTML) pages, pictures, video, audio, animations, code, scripts, or other content viewable by an end user in a browser or other application. This various network content can be stored and served by origin servers and equipment. The network content includes example website content referenced in FIG. 3, such as "www.gamma.gov," "www.alpha.com," and "www.beta.net," among others. In some examples, origin servers can serve the content to end user devices. However, when a content delivery system is employed, the content delivery system can act as a proxy to cache content between origin servers and the end user devices.

Content delivery systems can add a layer of caching between origin servers of the content providers and the end users. The content delivery systems typically have one or more content delivery nodes distributed across a large geographic region to provide faster and lower latency local access to the content for the end users. When end users request content, such as a web page, a locally proximate content delivery node will respond to the content request instead of the associated origin server. Various techniques can be employed to ensure the content delivery node responds to content requests instead of the origin servers, such as associating web content of the origin servers with network addresses of the content delivery nodes instead of network addresses of the origin servers using domain name system (DNS) registration and lookup procedures.

In many examples of a CDN, multiple network content sources are handled by a single CDN. For example, a CDN can be configured to cache website content of many different websites of many different website content originators. When many different end users request content at the same time or over a similar time period, a CDN can become overloaded and have a slow response for content requests. Also, when the content requests include requests for securely transferred content, such as over SSL or TLS protocols, further handshaking and processing are required to establish secure communication links for the requested content. This handshaking process for SSL/TLS protocols can be processor intensive, and require many processing resources of a content delivery node. Discussed herein are many examples that describe enhanced processing of this handshaking for SSL/TLS and other secure protocols using threaded processing.

Figure 1:
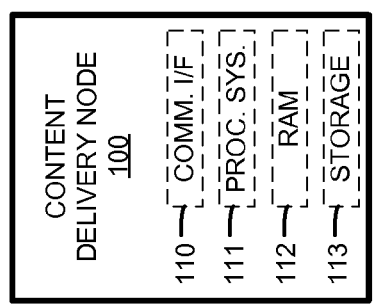
FIG. 1 is a block diagram illustrating a content delivery node.

As a first example, FIG. 1 is provided, which illustrates content delivery node (CDN) 100. CDN 100 includes communication interface 110, processing system 111, random access memory (RAM) 112, and storage 113.

In operation, processing system 111 is operatively linked to communication interface 110, RAM 112, and storage 113. Processing system 111 is capable of executing software stored in RAM 112 or storage 113. When executing the software, processing system 111 drives CDN 100 to operate as described herein. CDN 100 can also include other elements, such as user interfaces, computer systems, databases, distributed storage and processing elements, and the like.

Processing system 111 can be implemented within a single processing device, but can also be distributed across multiple processing devices or sub-systems that cooperate in executing program instructions. Examples of processing system 111 include general-purpose central processing units, microprocessors, application specific processors, and logic devices, as well as any other type of processing device.

Communication interface 110 includes one or more network interfaces for communicating over communication networks, such as packet networks, the Internet, and the like. The network interfaces can include one or more local or wide area network communication interfaces, which can communicate over Ethernet or Internet protocol (IP) links. Examples of communication interface 110 include network interface card equipment, transceivers, modems, and other communication circuitry.

RAM 112 and storage 113 together can comprise a data storage system. RAM 112 and storage 113 can each comprise any storage media readable by processing system 111 and capable of storing software. RAM 112 can include volatile and nonvolatile, removable and non-removable media implemented in any method or technology for storage of information, such as computer readable instructions, data structures, program modules, or other data. Storage 113 can include non-volatile storage media, such as solid-state storage media or flash memory. RAM 112 and storage 113 can each be implemented as a single storage device, but can also be implemented across multiple storage devices or sub-systems. RAM 112 and storage 113 can each comprise additional elements, such as controllers, capable of communicating with processing system 111. In some implementations, the storage media can be a non-transitory storage media. In some examples, at least a portion of the storage media can be transitory. It should be understood that in no case are the storage media propagated signals.

Software stored on or in RAM 112 or storage 113 can comprise computer program instructions, firmware, or some other form of machine-readable processing instructions having processes, that when executed by processing system 111, direct CDN 100 to operate as described herein. For example, software drives CDN 100 to receive requests for content, determine if the content is stored in CDN 100, retrieve content from origin servers, transfer content to end user devices, manage data storage systems for handling and storing the content, and establish secure communications over SSL/TLS or other secure protocols, among other operations. The software can also include user software applications. The software can be implemented as a single application or as multiple applications. In general, the software can, when loaded into processing system 111 and executed, transform processing system 111 from a general-purpose device into a special-purpose device customized as described herein.

Figure 2:
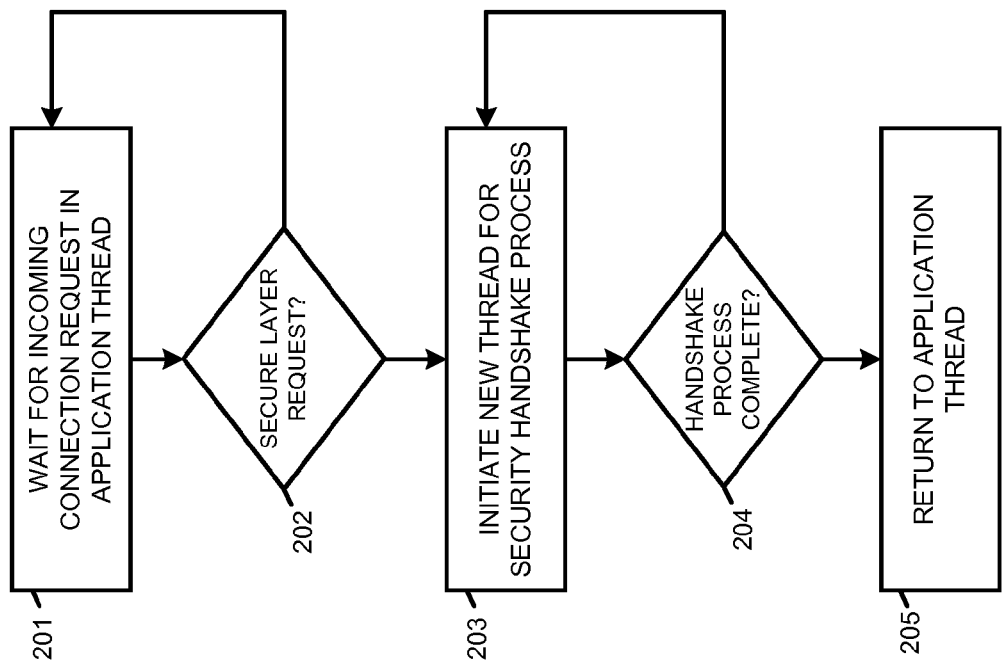
FIG. 2 is a flow diagram illustrating a method of operation of a content delivery node.

FIG. 2 illustrates a flow diagram that describes an example of operation of a content delivery node, such as for CDN 100 of FIG. 1. The operations of FIG. 2 are referenced parenthetically in the description below.

In FIG. 2, CDN 100 waits (201) for an incoming connection request in an application thread or process. This application can comprise a data thread, such as that for handling content requests of end users. In some examples, the application is a thread of execution of a content delivery application, such as a custom application, Varnish caching software, hypertext transfer protocol (HTTP) accelerator software, or other content caching and storage applications, including variation, modifications, and improvements thereof. In other examples, the application comprises instead an application process, and the handshaking thread described below comprises a thread subset from the application process. CDN 100 can monitor various network connections or communication interfaces, such as communication interface 110, to determine when an incoming connection request is received.

If the connection request comprises a secure layer request (202), then CDN 100 initiates (203) a new thread of execution for security the handshake process. The new thread can be a child thread or subset thread of the application process or data thread of operation 201. For example, when CDN 100 receives a content request, which includes a SSL or TLS connection request, then a new thread can be initiated from a pool or group of available threads, or may be spawned if no threads are available to handle the handshaking associated with that SSL/TLS connection request. Once the handshake process is complete (204), then the processing of the handshake thread returns (205) to the application process or data thread that initiated the handshake thread. In some instances, the handshaking thread may return to the pool of available threads for future handshaking processes. In other occurrences, when enough idle threads are already available, the handshaking thread may terminate.

In further examples, CDN 100 can receive multiple secure content requests simultaneously or concurrently. CDN 100 can initiate many new handshaking threads, one handshaking thread for each secure content request, so that a single application process or data thread can have many sub-threads or child threads for each of the handshaking operations. In this manner, initiation of new handshaking threads are event-driven based on secure content requests, and these multiple concurrent handshaking threads allow for multi-threaded operation. Thus, a hybrid operation is achieved combining both event-driven and multi-threaded operation.

Figure 3:
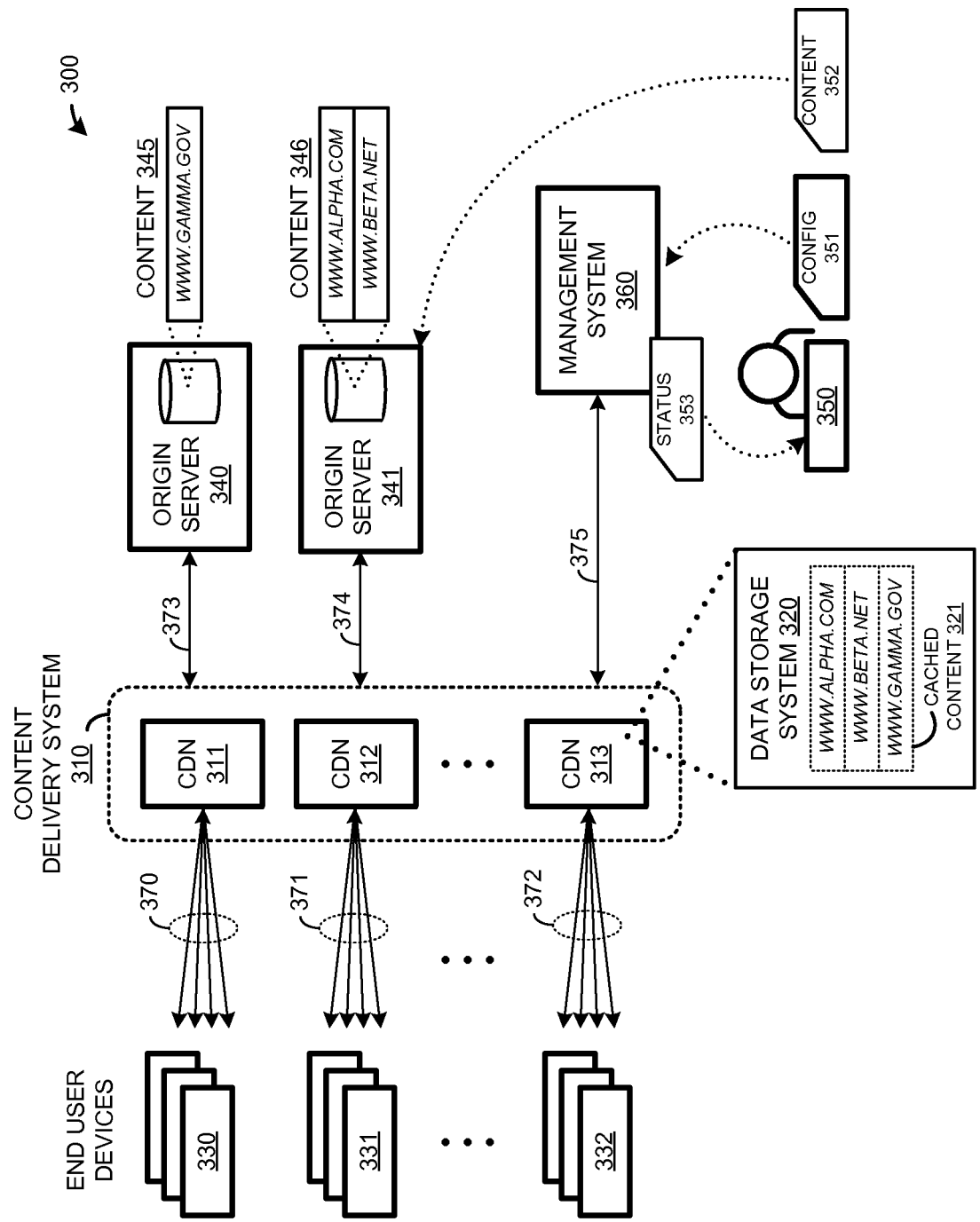
FIG. 3 is a system diagram illustrating a communication system.

As an example, employing multiple content delivery nodes in a content delivery system, FIG. 3 is presented. FIG. 3 can include one or more of CDN 100 of FIG. 1. FIG. 3 is a system diagram illustrating communication system 300. Communication system 300 includes content delivery system 310, end user devices 330-332, origin servers 340-341, and management system 360. Content delivery system 310 includes one or more content delivery nodes (CDN) 311-313. Each of CDN 311-313 can include one or more data storage systems, such as that illustrated for CDN 313 as data storage system 320. End user devices 330-332 are representative of a plurality of end user devices, which can request and receive network content, and any number of end user devices 330-332 can be associated with each of content delivery nodes 311-313. CDN 311-313 and ones of end users 330-332 communicate over associated network links 370-372. Content delivery system 310 and origin servers 340-341 communicate over associated network links 373-374. Content delivery system 310 and management system 360 communicate over link 375. Although not shown in FIG. 3 for clarity, each of CDN 311-313 can also communicate with each other over network links.

To further illustrate FIG. 3, a brief description of the operation of communication system 300 is included. In operation, end user devices 330-332 request network content, such as content 345-346 associated with origin servers 340-341. Instead of these requests being handled by the individual origin servers 340-341, individual content delivery nodes 311-313 of content delivery system 310 receive the content requests over ones of links 370-372 and process the content requests for delivery of the content to the associated end user devices 330-332. Requested network content that is already stored in ones of CDN 311-313 can be provided quickly to the end user devices, while network content that is not already stored in ones of CDN 311-313, can be responsively requested by an associated one of CDN 311-313 from an appropriate origin server 340-341 for delivery by the CDN and possible caching by the CDN. In this manner, each of CDN 311-313 can act as intermediary proxy nodes to provide local and fast access for end user devices 330-332 to network content of origin servers 340-341 without burdening origin servers 340-341. FIG. 3 shows cached content 321 included in data storage system 320 of CDN 313 as comprised of content 345-346, and thus content 345-346 is currently shown as cached by CDN 313. Other configurations are possible, including subsets of content 345-346 being cached in individual ones of CDN 311-313.

Although FIG. 3 shows content 345-346 of origin servers 340-341 being cached by data storage system 320, CDN 311-313 can handle other content. For example, dynamic content generated by activities of end user devices 330-332 need not originally reside on origin servers 340-341, and can be generated due to scripting or code included in web page content delivered by CDN 311-313. This dynamic content can also be cached by ones of CDN 311-313, and can be specific to a particular end user device during a communication session.

Management system 360 handles configuration changes and status information collection and delivery for system operators and for the origin server operators or managers. For example, operator device 350 can transfer configuration 351 for delivery to management system 360, where configuration 351 can alter the handling of network content requests by CDN 311-313, among other operations. Also, management system 360 can monitor status information for the operation of CDN 311-313, such as operational statistics, and provide this status information as 353 to operator device 350. Furthermore, operator device 350 can transfer content 352 for delivery to origin servers 340-341 to include in content 345-346. Although one operator device 350 is shown in FIG. 3, it should be understood that this is merely representative and communication system 300 can include many operator devices for receiving status information, providing configuration information, or transferring content to origin servers.

In one example, CDNs 311-313 are configured to identify secure layer connection requests within an application thread from end user devices 330-332. Once the secure requests are identified, CDNs 311-313 are configured to initiate new threads to handle the security handshake process necessary to provide the secure requested content. In some examples, the security handshake process may establish security credentials, encryption parameters, or any other communication parameters for a secure connection with the wireless device. In response to generating the communication parameters, the new threads are configured to return processing to the application thread to provide the requested content to the user devices.

Referring back to the elements of FIG. 3, CDN 311-313, origin servers 340-341, and management system 360 can each include communication interfaces, network interfaces, processing systems, computer systems, microprocessors, storage systems, storage media, or some other processing devices or software systems, and can be distributed among multiple devices. Examples of CDN 311-313, origin servers 340-341, and management system 360 can each include software such as an operating system, logs, databases, utilities, drivers, caching software, networking software, and other software stored on a computer-readable medium. Content delivery system 310, in addition to including CDN 311-313, can include equipment and links to route communications between CDN 311-313 and any of end user devices 330-332, origin servers 340-341, and management system 360, among other operations.

End user devices 330-332 can each be a user device, subscriber equipment, customer equipment, access terminal, smartphone, personal digital assistant (PDA), computer, tablet computing device, e-book, Internet appliance, media player, game console, or some other user communication apparatus, including combinations thereof.

Communication links 370-375 each use metal, glass, optical, air, space, or some other material as the transport media. Communication links 370-375 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 370-375 can each be a direct link or can include intermediate networks, systems, or devices, and can include a logical network link transported over multiple physical links. Although one main link for each of links 370-375 is shown in FIG. 3, it should be understood that links 370-375 are merely illustrative to show communication modes or access pathways. In other examples, further links can be shown, with portions of the further links shared and used for different communication sessions or different content types, among other configurations. Communication links 370-375 can each include many different signals sharing the same associated link, as represented by the associated lines in FIG. 3, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

Figure 4:
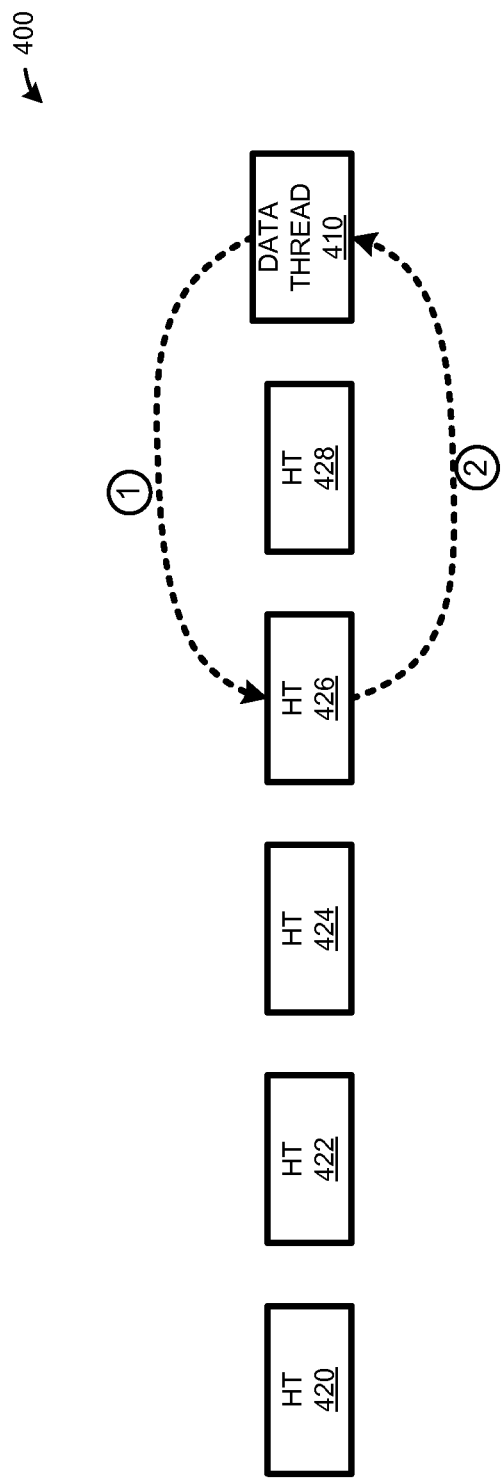
FIG. 4 is a block diagram illustrating threaded processes.

FIG. 4 is a block diagram illustrating multiple handshaking threads initiated from a single data thread or application thread. FIG. 4 includes threaded configuration 400, which includes data thread 410 and handshaking threads (HT) 420-428. Threads 410 and 420-428 can be executed on a processing system of CDN 311-313 of FIG. 3 or CDN 100 of FIG. 1, although other configurations are possible. Initially, data thread 410 monitors for a secure content request, such as for an SSL or TLS content request. Upon receipt of a secure content request, data thread 410 initiates a subset thread as one of handshaking threads 420-428, as indicated by the numeral '1' for handshaking thread 426 in FIG. 4.

Handshaking thread 426 processes the secure content request to establish security credentials, encryption parameters, and other communication parameters for a secure connection between a CDN and an end user, such as for a SSL or TLS session or connection. Once the handshaking process is complete, handshaking thread 426 returns processing to data thread 410, which in this example is the thread or process that initiated handshaking thread 426. In some examples, handshaking thread 426 is returned to a pool of available threads for future processes. In other examples, handshaking thread 426 may be terminated if enough threads are already available for future secure handshakes.

Other concurrent or simultaneous handshaking threads 420-424 and 428 are also shown to illustrate a multi-threaded operation, where each individual thread is initiated on an event-driven operation from a single data thread or application process illustrated by data thread 410. The other handshaking threads 420-424 and 428 are initiated responsive to further secure content requests of other end users.

Figure 5:
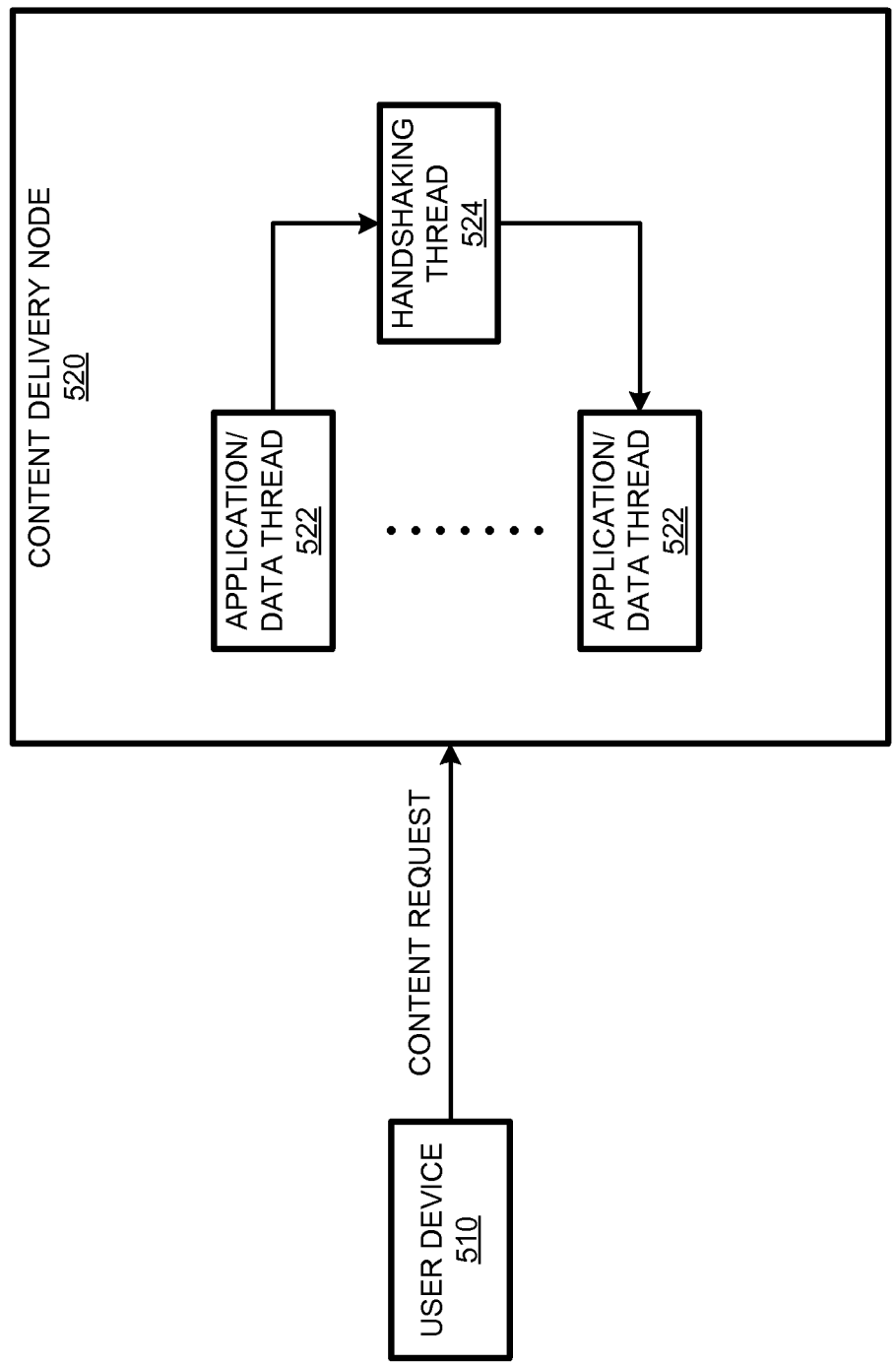
FIG. 5 is a block diagram illustrating an operation of a content delivery node.

Turning now to FIG. 5, FIG. 5 illustrates a block diagram for operating a content delivery node. FIG. 5 includes user device 510 and content delivery node 520. In operation, user device 510 is configured to transfer a content request to content delivery node 520. Once the request is received by content delivery node 520, the request may be placed within an application or data thread 522 to retrieve the appropriate content. As the requests are being processed, content delivery node 520 is configured to identify a secure layer connection request within the application thread. This secure request may comprise a secure sockets layer (SSL) request or a transport layer security (TLS) request in some examples.

Once the secure request is identified, content delivery node 520 is configured to initiate a new handshaking thread 524 based on the secure layer connection request. The new thread is configured to process the secure layer connection request to establish security credentials, encryption parameters, or any other communication parameters for a secure connection between user device 510 and content delivery node 520. In response to establishing the communication parameters, handshaking thread 524 is configured to return processing to application thread 522. Once returned, application thread 522 may be configured to gather the requested content for user device 510 and transfer the content to the user device.

In some examples, handshaking thread 524 may be in initiated from a pool or group of available threads. However, if no threads are available, handshaking thread 524 may be spawned rather than drawn from the preexisting pool or group. Further, the process of returning from handshaking thread 524 may comprise returning the thread to an idle state in a pool of other available threads or, if enough threads are already available, terminating handshaking thread 524.

Although illustrated with a single handshaking thread in the present example, it should be understood that application thread 522 might include any number of secure content requests. Accordingly, as the secure content requests are identified within application thread 522, any number of handshaking threads may be initiated to determine communication parameters between the user devices and the content delivery node.

Figure 6:
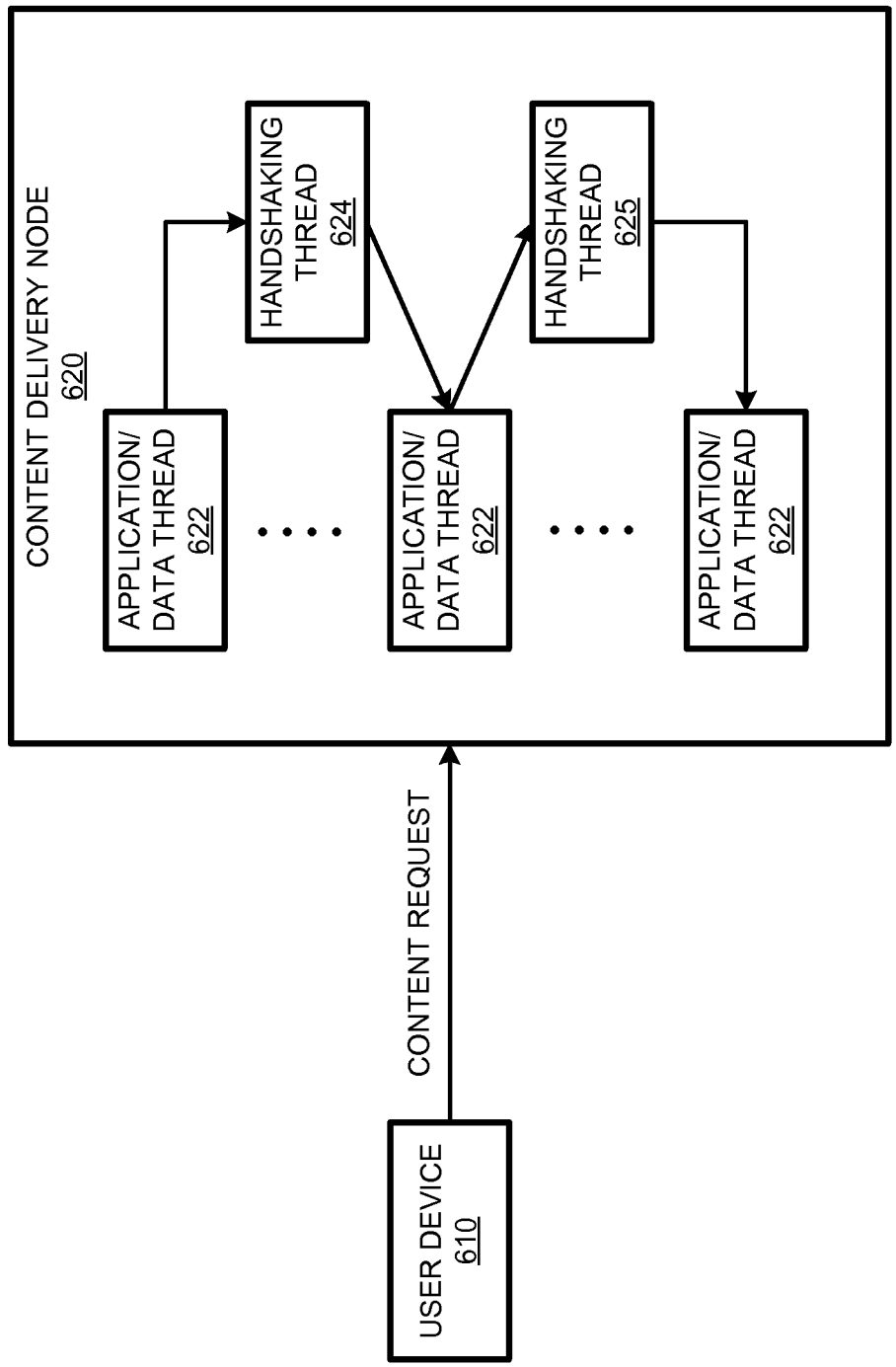
FIG. 6 is a block diagram illustrating an operation of a content delivery node.

To further illustrate the initiation of handshaking threads, FIG. 6 is included. FIG. 6 illustrates a block diagram for operating a content delivery node according to one example. FIG. 6 includes user device 610 and content delivery node 620, which further includes application or data thread 622 and handshaking threads 624-625.

In operation, user devices, such as user device 610, may be configured to pass content requests to content delivery node 620. Content delivery node 620 is configured to receive the requests and provide the requested content to end user devices. In some examples, the requests by the end users may include requests for secured content. As a result, the content delivery node must first verify the device before responding to the device.

Using the example in FIG. 6, the content requests for user device 610 are placed in application or data thread 622. This thread is used to provide the content to the user devices as the requests are processed, however, when a SSL or TLS security request is identified, content delivery node 620 is configured to initiate a new handshaking thread 624 to process the request. Handshaking thread 624 is configured to process the secure layer connection request to establish security credentials, encryption parameters, or any other communication parameters for a secure connection. Once the handshaking is complete between the device and the delivery node, handshaking thread 624 is configured to return the processing to application or data thread 622.

As further illustrated in FIG. 6, any number of secure layer connection requests may be received by content delivery node 620. Accordingly, once another request is identified in data thread 622, content delivery node 620 is configured to initiate or spawn a second handshaking thread 625. This handshaking thread is configured to determine the communication parameters between the user device and the content delivery node and, upon completion, return the processing to data thread 622.

Although illustrated in the present example with two handshaking threads, it should be understood that any number of handshaking threads might be initiated from application or data thread 622. Further, in some instances, multiple handshaking threads may be initiated at once to determine the communication parameters between content delivery node 620 and the user devices. Once the parameters are established, content delivery node 620 may provide the requested content to the end user device.

In the previous examples of FIGS. 1-6, secure layer connection requests have been provided to content delivery nodes. However, it should be understood that any serving device, such as a server computer, desktop computer, and the like, might implement the same processes described in FIGS. 1-6.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein can be in the form of a functional diagram, operational sequence, or flow diagram, and can be described as a series of acts, it is to be understood and appreciated that the methodologies are not limited by the order of acts, as some acts can, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology can be required for a novel implementation.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above.

What is claimed is:

1. A method of operating a content delivery node that caches content for delivery to end user devices, the method comprising:

during execution of an application thread responsive to content request activity of at least an end user device, identifying a secure layer connection request within the application thread;

responsive to the secure layer connection request, initiating a security handshake process as a handshake thread selected from among a pool of idle handshake threads to execute the security handshake process for the application thread; and in response to the handshake thread completing the security handshake process, returning to the application thread and returning the handshake thread to the pool of idle handshake threads.

2. The method of claim 1 wherein the secure layer connection request comprises a secure sockets layer request.

3. The method of claim 1 wherein the secure layer connection request comprises a transport layer security request.

4. The method of claim 1 wherein the application thread comprises a data thread.

5. The method of claim 4 wherein the data thread comprises a thread that handles the content request activity associated with the end user device.

6. The method of claim 1 further comprising:
identifying a subsequent secure layer connection request within the application thread;
responsive to the pool of idle handshake threads having no presently available threads, initiating a new handshake thread for a second security handshake process to handle the subsequent secure layer connection request; and
in response to completing the second security handshake process, returning to the application thread and placing the new handshake thread to the pool of idle handshake threads.

7. The method of claim 1 wherein the security handshake process verifies the end user device to receive data content associated with the content request activity.

8. The method of claim 1 wherein the security handshake process establishes communication parameters for a secure connection between the content delivery node and the end user device.

9. The method of claim 1, further comprising:
responsive to returning the handshake thread to the pool of idle threads, terminating the handshake thread.

10. A computer apparatus to operate a content delivery node that caches content for delivery to end user devices, the computer apparatus comprising:
processing instructions that direct the content delivery node, when executed by the content delivery node, to:
during execution of an application thread responsive to content request activity of at least an end user device, identify a secure layer connection request within the application thread;
responsive to the secure layer connection request, initiate a security handshake as a handshake thread selected from among a pool of idle handshake threads to execute the security handshake process for the application thread; and
in response to the handshake thread completing the security handshake process, return to the application thread and returning the handshake thread to the pool of idle handshake threads; and
one or more non-transitory computer readable media that store the processing instructions.

11. The computer apparatus of claim 10 wherein the secure layer connection request comprises a secure sockets layer request.

12. The computer apparatus of claim 10 wherein the secure layer connection request comprises a transport layer security request.

13. The computer apparatus of claim 10 wherein the application thread comprises a data thread.

14. The computer apparatus of claim 13 wherein the data thread comprises a thread that handles the content request activity associated with the end user device.

15. The computer apparatus of claim 10 wherein the processing instructions further direct the content delivery node to:
responsive to the pool of idle handshake threads having no presently available threads, identify a subsequent secure layer connection request within the application thread;
initiate a new handshake thread for a second security handshake process to handle the subsequent secure layer connection request; and
in response to completing the second security handshake process, return to the application thread and place the new handshaking thread to the pool of idle handshaking threads.

16. The computer apparatus of claim 10 wherein the security handshake process verifies the end user device to receive data content associated with the content request activity.

17. The computer apparatus of claim 10 wherein the security handshake process establishes communication parameters for a secure connection between the content delivery node and the end user device.

18. The computer apparatus of claim 10 wherein the processing instructions that direct the content delivery node to return to the application thread direct the content delivery node to terminate the handshake thread responsive to returning the handshake thread to the pool of idle threads.

19. A method for operating a content delivery node that caches content for delivery to end user devices, the method comprising:
receiving content requests from the end user devices;
initiating an application thread to service the content requests;
identifying a plurality of secure layer connection requests for the application thread that are associated with the content requests; and
performing a multi-threaded security handshaking process by at least selecting handshake threads for each of the security layer connection requests from among a plurality of idle handshake threads to service the security layer connection requests for the application thread.

20. The method of claim 19 wherein the application thread comprises a data thread for processing the content requests.

* * * * *